United States Patent
Haase et al.

(10) Patent No.: US 9,916,312 B1
(45) Date of Patent: Mar. 13, 2018

(54) COORDINATION OF FILE SYSTEM CREATION TO ENSURE MORE DETERMINISTIC PERFORMANCE CHARACTERISTICS

(71) Applicant: EMC Corporation, Hopkinton, MA (US)

(72) Inventors: David Haase, Fuquay Varina, NC (US); Michael C. Brundage, Cary, NC (US); Walter C. Forrester, Berkeley Heights, NJ (US); Paul T. McGrath, Raleigh, NC (US); Miles A. de Forest, Bahama, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 517 days.

(21) Appl. No.: 14/319,764

(22) Filed: Jun. 30, 2014

(51) Int. Cl.
    *G06F 17/30* (2006.01)
(52) U.S. Cl.
    CPC .............. *G06F 17/30091* (2013.01)
(58) Field of Classification Search
    CPC ... G06F 3/0689; G06F 3/0662; G06F 12/0246
    USPC .................. 707/822, 827; 711/114
    See application file for complete search history.

(56) References Cited

U.S. PATENT DOCUMENTS

| | | | |
|---|---|---|---|
| 7,631,155 B1 | 12/2009 | Bono et al. | |
| 7,873,700 B2 | 1/2011 | Pawlowski et al. | |
| 8,285,967 B1 | 10/2012 | Veeraswamy et al. | |
| 9,122,589 B1 * | 9/2015 | Bono et al. | |
| 9,122,697 B1 * | 9/2015 | Bono et al. | |
| 9,122,712 B1 * | 9/2015 | Bono et al. | |
| 9,280,555 B1 * | 3/2016 | Bono et al. | |
| 9,286,007 B1 * | 3/2016 | Bono et al. | |

OTHER PUBLICATIONS

Gregory Chockler et al., Reliable Distributed Storage, 2009, vol. 42, 60-67.*

* cited by examiner

*Primary Examiner* — Jean B Fleurantin
(74) *Attorney, Agent, or Firm* — BainwoodHuang

(57) ABSTRACT

A method includes (a) receiving a command to create an upper-deck filesystem of a specified size, the upper-deck filesystem residing within a logical volume expressed from a container file of a lower-deck filesystem, (b) provisioning a plurality of storage provisioning units (SPUs) from a storage pool of the data storage system to the container file in an order reflecting proximity of the SPUs within storage devices of the data storage system, the plurality of SPUs providing storage for the entire container file, and (c) subsequent to provisioning the plurality of SPUs to the container file, executing a plurality of threads in parallel to write metadata of the upper-deck filesystem to the plurality of SPUs, representing the upper-deck filesystem. Other embodiments are directed to a system, a computerized apparatus, and a computer program product for performing methods similar to that described above.

15 Claims, 3 Drawing Sheets

COORDINATION OF FILE SYSTEM CREATION TO ENSURE MORE DETERMINISTIC PERFORMANCE CHARACTERISTICS

BACKGROUND OF THE INVENTION

Data storage systems are used to store large quantities of data on arrays of persistent storage devices. Some data storage systems provide storage to a storage area network (SAN) at a block level, while other data storage systems provide file-based storage via network attached storage protocols.

BRIEF SUMMARY OF THE INVENTION

Some data storage systems in continued development are configurable to apply both file-based and block-based storage. Some of these systems utilize a sparsely-provisioned lower-deck filesystem to dynamically allocate container files that may be used to represent storage volumes accessible by block-protocols. These systems also provide an upper-deck filesystem that sits on top of these storage volumes provided by the container files so that file-based access may also be provided.

Unfortunately, the above-described systems may suffer from deficiencies when creating upper-deck filesystems. When an upper-deck filesystem is created, it may be desirable to use multiple threads to format various sections of the upper-deck filesystem (e.g., to lay down the filesystem's metadata) in parallel. However, as metadata is written to the upper-deck filesystem, a container file in the lower-deck filesystem may be provisioned on-the-fly. Operation of multiple threads may result in the container file being provisioned with storage from different sets of storage devices or otherwise divergent locations within the data storage system, which may result in reduced performance of the upper-deck filesystem.

Thus, it would be desirable to configure a data storage system to format an upper-deck filesystem using fast parallelization techniques, while also provisioning the lower-deck filesystem efficiently to yield predictably high performance. This result may be accomplished by pre-provisioning the lower-deck filesystem with enough storage so that the container file is made up of proximately located storage units for more predictable performance.

One embodiment of the improved techniques is directed to a method. The method includes (a) receiving a command to create an upper-deck filesystem of a specified size, the upper-deck filesystem residing within a logical volume expressed from a container file of a lower-deck filesystem, (b) provisioning a plurality of storage provisioning units (SPUs) from a storage pool of the data storage system to the container file in an order reflecting proximity of the SPUs within storage devices of the data storage system, the plurality of SPUs providing storage for the entire container file, and (c) subsequent to provisioning the plurality of SPUs to the container file, executing a plurality of threads in parallel to write metadata of the upper-deck filesystem to the plurality of SPUs, representing the upper-deck filesystem. Other embodiments are directed to a system, a computerized apparatus, and a computer program product for performing methods similar to that described above.

These embodiments are advantageous because they allow a data storage system to quickly create an upper-deck filesystem with deterministically improved performance characteristics.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments are directed to techniques for pre-provisioning the lower-deck filesystem with enough storage so that the container file may be made up of proximately located storage units for predictably high performance.

Figure 1:
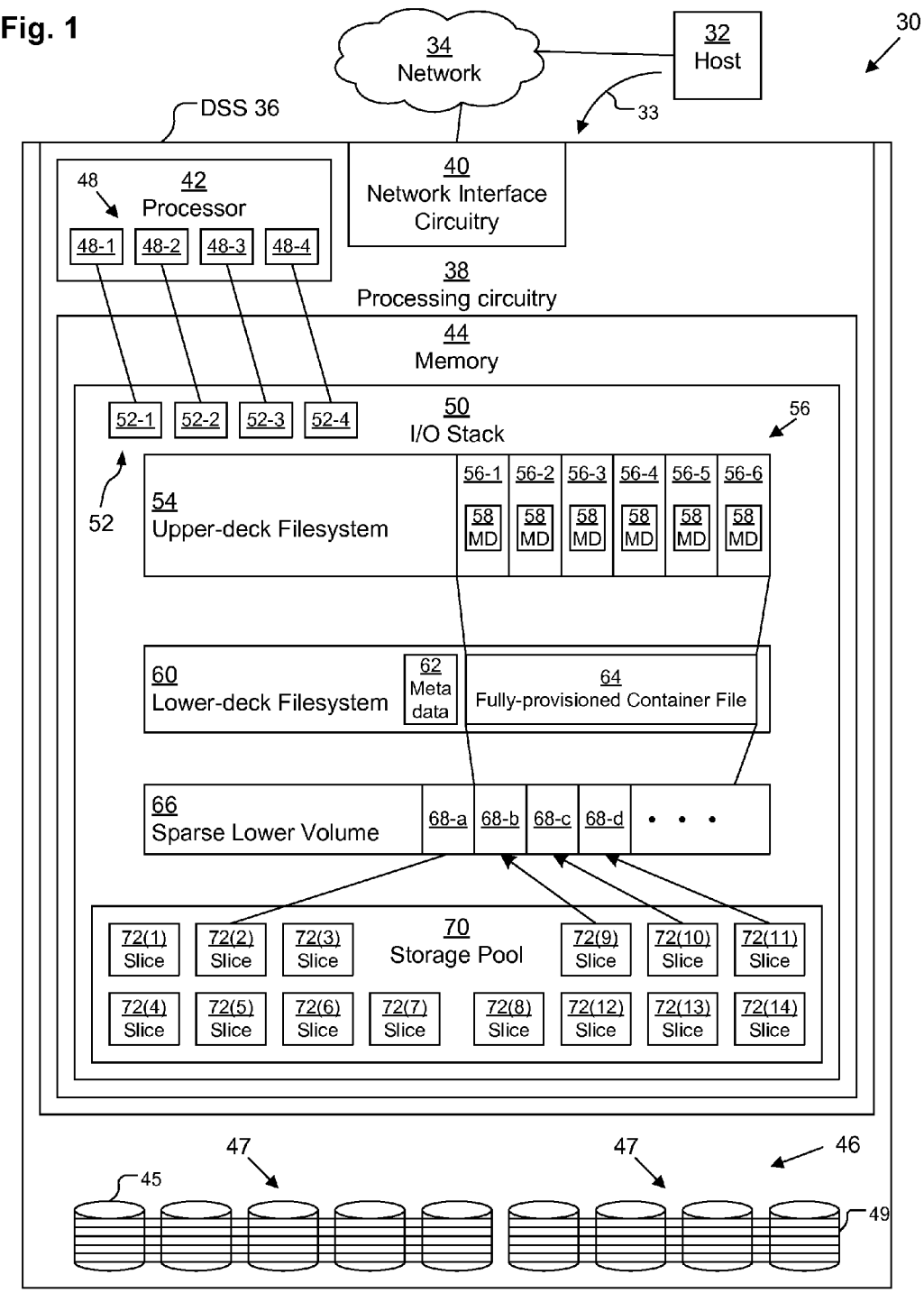
FIG. 1 depicts an example data storage system according to various embodiments.

FIG. 1 depicts an example storage environment 30. Environment 30 includes one or more host computers 32, a network 34, and a data storage system (DSS) 36. A host computer 32 may be any kind of computing device capable of issuing data storage commands, such as, for example, a personal computer, a workstation computer, a server computer, an enterprise server computer, a laptop computer, a tablet computer, a smart phone, etc. Host computers 32 are configured to send an upper-deck filesystem creation command 33.

Network 34 may be any kind of network capable of interconnecting host computers 32 with DSS 36 and communicating data storage commands and responses. Network 34 is typically a local area network (LAN), a wide area network (WAN), a virtual private network (VPN), a point-to-point connection, or a fabric of interconnected hubs, switches, and/or cables configured to send packet-based signals, typically over Ethernet connections. Network 34 is capable of transferring file-based commands (i.e., using a file-based network storage protocol, such as, for example, the Network File System (NFS) or the Common Internet File System (CIFS)) to the DSS 36 and providing file-based responses from the DSS 36 back to the host computers 32.

DSS 36 may be any kind of computing device that provides storage, such as, for example, a personal computer, a workstation computer, a server computer, an enterprise server computer, a laptop computer, a tablet computer, a smart phone, etc. Typically, however, DSS 36 will be a data storage array, such as, for example, a VNX®, VNXe®, or CLARiiON® CX4 data storage array provided by the EMC Corporation of Hopkinton, Mass.

DSS 36 includes processing circuitry 38 and persistent data storage 46. Processing circuitry 38 may take the form of a storage processor board having various components thereon. These components include network interface circuitry 40, a processor 42, and system memory 44. There may be multiple independent storage processor boards per DSS 36, arranged in a highly-available fault-tolerant manner.

Network interface circuitry 40 may include one or more Ethernet cards, cellular modems, Wireless Fidelity (WiFi) wireless networking adapters, any other devices for connecting to the network 34, or some combination thereof.

Processor 42 may be any kind of processor or set of processors configured to perform operations, such as, for example, a microprocessor, a multi-core microprocessor, a digital signal processor, a system on a chip, a collection of electronic circuits, a similar kind of controller, or any combination of the above. Processor 40 may also include processing circuitry configured to control and connect to the persistent storage 46. Processor is capable of executing multiple threads 48 in parallel.

Memory 44 may be any kind of digital system memory, such as, for example, random access memory (RAM). Memory 44 stores an operating system (OS) (not depicted, e.g., Linux, UNIX, Windows, or a similar operating system) and one or more applications (not depicted) executing on processor 42 as well as data (not depicted) used by those applications.

Persistent storage 46 may be made up of a set of persistent storage devices 45, such as, for example, hard disk drives, solid-state storage devices, flash drives, etc. Persistent storage 46 may be configured in sets of RAID (Redundant Arrays of Independent Disks) groups 47, each RAID group 47 being made up of multiple storage devices 45. Each RAID group 47 provides a set of storage elements, such as slices 49, which are storage divisions within each RAID group 47 that are able to serve as storage provisioning units for use in dynamically provisioning storage in discrete chunks. Slices 49 may be of any convenient size for storage provisioning, but typically they are large enough so that there are not more than a few thousand per RAID group. Thus, in one embodiment, a slice is 256 megabytes in size, while, in another embodiment, a slice is 1 gigabyte in size.

Memory 38 also stores a storage input/output (I/O) stack 50, which includes various layered I/O drivers and data used in processing storage commands. I/O stack 50 may also include parallel memory spaces 52 for various threads 48 running on processor that relate to the I/O stack 50.

I/O stack 50 includes an upper-deck filesystem 54 that rests upon a volume provided by a fully-provisioned container file 64 within a lower-deck filesystem 60. Lower-deck filesystem 60 also includes its own metadata 62. Lower-deck filesystem 60 rests upon a sparse lower volume 66, which has an address space populated with slices 68 that are drawn from a storage pool 70. Storage pool 70 provides an ordered set of slices 72 (depicted as slices 72(1), 72(2), . . . , 72(14)), which are themselves drawn from the slices 49 within persistent storage 46.

Upon creation of the lower-deck filesystem 60, its metadata 62 (which may include an inode table, block metadata, and other filesystem metadata as is well-known in the art) is initially created. Since the lower-deck filesystem 60 requires backing within the sparse lower volume 66, the metadata 62 will be placed within one or more metadata slices 68-*a* of the sparse lower volume 66, the metadata slice(s) 68-*a* being depicted as coming from slice 72(2), by way of example only.

Normally, a file within the lower-deck filesystem 60, even once created, would not have any backing within the sparse lower volume 66 until data is written to that file, i.e., slices 68 within the sparse lower volume 66 are provisioned as needed to back the data as written. However, because lower-deck filesystem 60 includes a fully-provisioned container file 64, as soon as it is created (or immediately thereafter), the fully-provisioned container file 64 is backed by a set of slices 68 (depicted as slices 68-*b*, 68*c*, 68-*d*, . . . ), which are themselves drawn from the ordered slices 72 of the storage pool 70. As depicted, slices 68-*b*, 68*c*, 68-*d* of the sparse lower volume 66 are backed by slices 72(9), 72(10), 72(11), which are consecutively numbered within the storage pool 70 and physically proximate within persistent data storage 46.

In order to format the upper-deck filesystem 54, the I/O stack 50 divides the upper-deck filesystem 54 into a set of divisions 56 (depicted as divisions 56-1, . . . , 56-6), each of which should contain its own respective filesystem metadata 58 (e.g., inodes, block metadata, slice marks, etc.). I/O stack 50 is then able to assign a set of parallel threads 48-1, 48-2, 48-3, 48-4 to individual divisions 56 to write metadata to each of those divisions 56. For example, thread 48-1 may be initially assigned to write metadata 58 to division 56-1 using its own memory space 52-1, while thread 48-2 may be initially assigned to write metadata 58 to division 56-2 using its own memory space 52-2. Similarly, thread 48-3 may be initially assigned to write metadata 58 to division 56-3 using its own memory space 52-3, while thread 48-4 may be initially assigned to write metadata 58 to division 56-4 using its own memory space 52-4. Once the first thread 48 finishes writing the metadata 58 for its assigned division 58, that thread 48 will be assigned to write the metadata for one of the remaining divisions 56. Thus, for example, if thread 48-2 finishes first, thread 48-2 may be reassigned to write the metadata 58 to division 56-5, and if thread 48-3 finishes second, thread 48-3 may be reassigned to write the metadata 58 to division 56-6.

Figure 2:
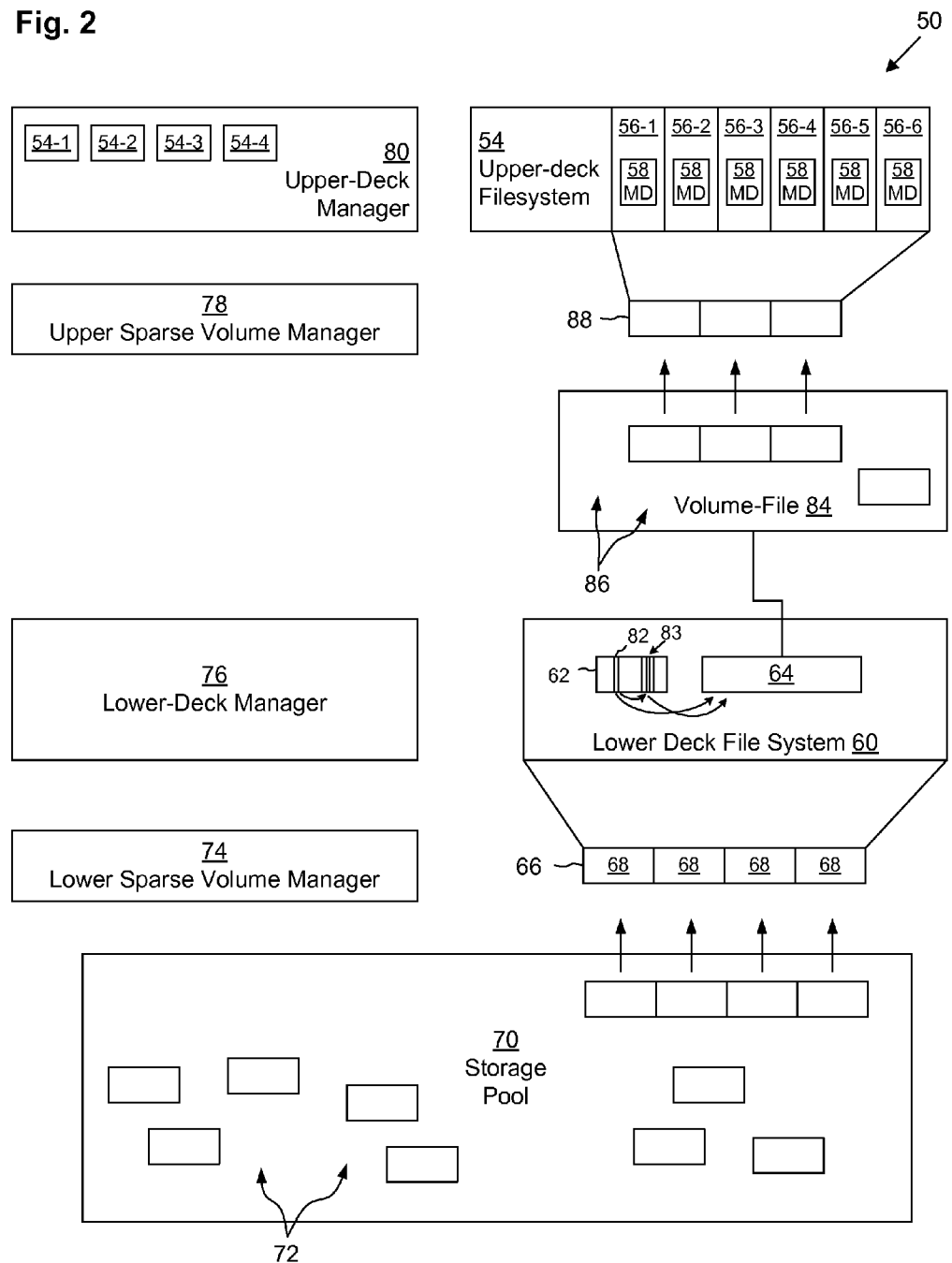
FIG. 2 depicts an example I/O stack for use in conjunction with various embodiments.

FIG. 2 illustrates further detail with respect to an example I/O stack 50. I/O stack 50 includes a layered set of drivers 74, 76, 78, 80. Additional drivers may also be included within I/O stack 50, as any person skilled in the art would appreciate, but they are not described for the sake of clarity. However, additional detail with respect to an architecture suitable for use in conjunction with various embodiments is described in U.S. patent application Ser. No. 13/828,322, entitled "UNIFIED DATAPATH ARCHITECTURE," filed on Mar. 14, 2013, the entire contents and teachings of which are hereby incorporated herein by this reference.

As shown in FIG. 2, lower sparse volume manager 74 manages the sparse lower volume 66, populating it with slices 68 drawn from the slices 72 of the storage pool 70. Lower-deck manager 76 manages the lower-deck filesystem 60, creating the lower-deck metadata 62 and various files including the fully-provisioned container file 64. Lower-deck metadata 62 includes an inode 82 that points to the fully-provisioned container file 64. Since the fully-provisioned container file 64 is typically too large to fit within just a few blocks, inode 82 also points to a set of indirect blocks 83 that point to additional blocks of the fully-provisioned container file 64.

Fully-provisioned container file 64 functions as a volume file 84, which serves as a pool for a sparse upper volume 88. The volume file 84 provides its own slices 86 (which may be of different size than the slices 49, 68, 72 below) to populate the sparse upper volume 88. Upper sparse volume manager 78 manages the volume file 84 and upper sparse volume 88.

Upper-deck manager 80 manages upper-deck filesystem 80, dividing the upper-deck filesystem 80 into divisions 56 and launching threads 48 to lay down the filesystem metadata 58 associated with each division 56.

Figure 3:
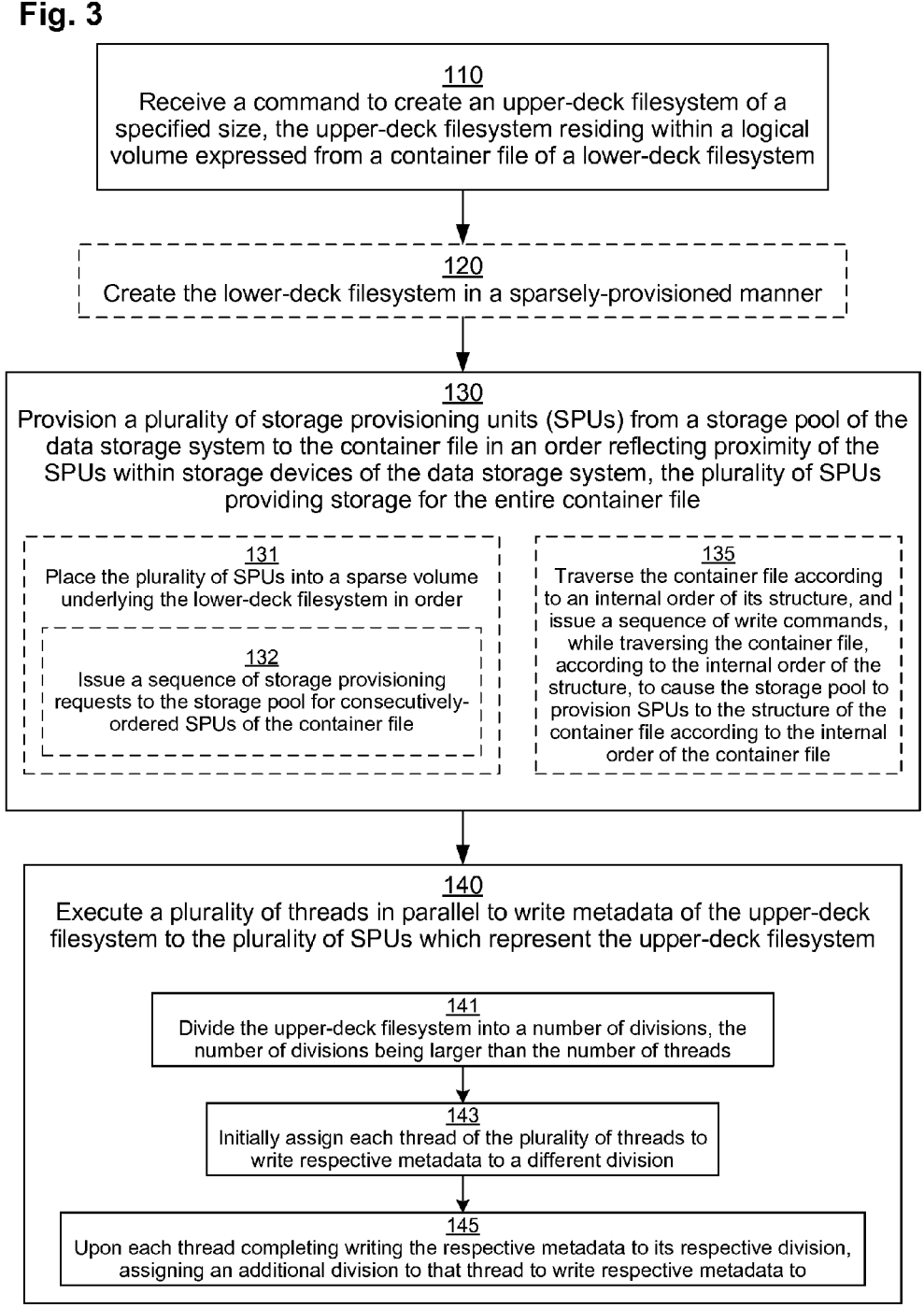
FIG. 3 depicts an example method according to various embodiments.

FIG. 3 illustrates an example method 100 according to various embodiments for pre-provisioning the lower-deck filesystem with enough storage so that the container file 64 may be made up of physically proximate storage units for predictably high performance. It should be understood that any time a piece of software, such as, for example, I/O stack 50 (or any of its driver components 74, 76, 78, 80), is described as performing a method, process, step, or function, in actuality what is meant is that a computing device (e.g., DSS 36) on which that piece of software 50, 74, 76, 78, 80 is running performs the method, process, step, or function when executing that piece of software on its processor 42.

It should be understood that, within FIG. 3, step 120 is dashed because it is ancillary to method 100. In addition, sub-steps 131-132 and 135 are dashed because they represent alternative means of implementing step 130.

In step 110, I/O stack receives a command 33 to create an upper-deck filesystem 54 of a specified size, the upper-deck filesystem 54 residing within a logical volume 88 expressed from a container file 64 of a lower-deck filesystem 60.

In step 120, if the lower-deck filesystem 60 has not yet been created, the I/O stack 50 sends a command to the lower-deck manager 76 to instruct the lower-deck manager 76 to create the lower-deck filesystem 60.

In step 130, the I/O stack provisions a plurality of SPUs (e.g., slices 72) from a storage pool 70 of the DSS 36 to the container file 64 in an order reflecting proximity of the SPUs within the storage devices 46, the plurality of SPUs providing storage for the entire container file 64. In particular, the I/O stack 50 sends a command to the lower-deck manager 76, instructing the lower-deck manager 76 to create the container file 64 (and its associated inode 82 and indirect blocks 83) with a size sufficient to support the upper-deck filesystem 54 of the specified size and the I/O stack 50 also sends a command to the lower-deck manager 76, instructing the lower-deck manager 76 to fully provision the container file 64.

In different embodiments, there are at least two ways that the lower-deck manager 76 may fully provision the container file 64.

In one embodiment, lower-deck manager 76 executes sub-step 131. In sub-step 131, lower-deck manager 76 directs the lower sparse volume manager 74 to place the plurality of SPUs (e.g., slices 72) into a sparse volume (e.g., sparse lower volume 66) underlying the lower-deck filesystem 60 in order. Thus, for example, lower sparse volume manager 74 provisions slices 72(9), 72(10), 72(11), etc. into the sparse lower volume 66 as slices 68-b, 68-c, 68-d, etc. (slice 68-a having already been provisioned from slice 72(2) at the time the lower-deck filesystem 60 was first created). In some embodiments, instead of issuing a single command for all of the slices 68-b, 68-c, 68-d, etc. of the container file 64 at once, the lower-deck manager 76 or the lower sparse volume manager 74 may instead, in sub-step 132, issue a separate command to provision each slice 68-b, 68-c, 68-d, etc. of the container file 64 from the storage pool 70, provided that the commands are issued in close proximity to each other, ensuring that the storage pool 70 provides adjacent slices 72 (i.e., slices 72 that represent underlying slices 49 that are located in adjacent positions within a given RAID group 47 to the extent that there is sufficient room within a single RAID group 47).

In another embodiment, lower-deck manager 76 executes sub-step 135. In sub-step 135, lower-deck manager 76 traverses the container file 64 according to an internal order of its structure, and issues a sequence of write commands, while traversing the container file 64, according to the internal order of the structure, to cause the storage pool 70 to provision SPUs (e.g., slices 72) to the structure of the container file 64 according to the internal order of the container file 64. Thus, for example, if container file 64 is 3 gigabytes in size, and each slice 68, 72 is 1 gigabyte in size. Thus, lower-deck manager 76 will first issue a first write command directed at a block (e.g., block 1) within the first gigabyte of the address space of the container file 64. This first write command will be a simple command that may be performed quite quickly. Thus, for example, the first write command may direct that block 1 be initialized to all zeroes. In order to fulfill this first write command, the lower sparse volume manager 74 will have to provision the first gigabyte address space of the container file 64 by providing a slice 72 (e.g., 72(9)) from the storage pool as slice 68-b, which is the first slice of the container file 64.

Then, lower-deck manager 76 will issue a second write command (similar to the first write command) directed at a block (e.g., block 262,145, given a 4-kilobyte block size) within the second gigabyte of the address space of the container file 64. In order to fulfill this second write command, the lower sparse volume manager 74 will have to provision the second gigabyte address space of the container file 64 by providing a slice 72 (e.g., 72(10)) from the storage pool as slice 68-c, which is the second slice of the container file 64. Then, the lower-deck manager 76 will issue a third write command (similar to the first write command) directed at a block (e.g., block 524,289, given a 4-kilobyte block size) within the third gigabyte of the address space of the container file 64. In order to fulfill this third write command, the lower sparse volume manager 74 will have to provision the third gigabyte address space of the container file 64 by providing a slice 72 (e.g., 72(11)) from the storage pool as slice 68-d, which is the third slice of the container file 64.

It should be pointed out that, in all embodiments, in step 130, adjacent slices 72 (e.g., from slices 49 that are proximate within a RAID group 47, or, in the case of a very large container file 64, as few RAID groups 47 as possible) are provisioned to the sparse lower volume 66 to represent the container file 64 with as few gaps as possible. Preferably, not only are the slices 72 adjacent within the storage pool 70 (and the RAID groups 47), but the adjacent slices 72 should also be arranged in the same order within the sparse lower volume as the slices 68.

In step 140, I/O stack 50 directs the upper-deck manager 80 to execute a plurality of threads 48 in parallel to write metadata 58 of the upper-deck filesystem 54 to the plurality of SPUs (e.g., slices 68-b, 68-c, 68-d, etc., or equivalently, slices 72(9), 72(10), 72(11), etc.) which represent the upper-deck filesystem 54 at the lower level.

Upper-deck manager 80 accomplishes this by initiating a plurality of threads 48, each with its own memory 52. Upper-deck manager 80 may initiate any number of threads 48 depending on the size of the upper-deck filesystem 54 and the number of cores of the processor 42, as well as on the current processor utilization. For example, upper-deck manager 80 may initiate thirty-two (32) threads 48 for a large upper-deck filesystem 54 that is 500 gigabytes in size.

Step 140 may be accomplished in several sub-steps 141-145.

In step 141, upper-deck manager 80 divides the upper-deck filesystem 54 into a number of divisions 56, the number of divisions 56 being larger than the number of threads 48. Thus, for a 500 gigabyte filesystem, the upper-deck manager 80 may divide the upper-deck filesystem 54 into fifty (50) divisions 56.

In step 143, upper-deck manager 80 initially assigns each thread 48 to write respective metadata 58 to a different division 56. Thus, for example, upper-deck manager 80 initially assigns thread 48-1 to write upper-deck filesystem metadata 58 (e.g., an inode table and block metadata) to division 56-1 (which occupies bytes 0 through 10,737,418, 239 of the upper-deck filesystem 54) and also initially assigns thread 48-2 to write upper-deck filesystem metadata 58 (e.g., block metadata) to division 56-2 (which occupies bytes 10,737,418,240 through 21,474,836,479 of the upper-deck filesystem 54). Since there is more metadata 58 to write to division 56-1 than to division 56-2, thread 48-2 will most likely finish writing metadata 58 to division 56-2 before thread 48-1 finishes writing metadata 58 to division 56-1.

In step 145, upon each thread 48 completing writing the respective metadata 58 to its respective division 56, upper-deck manager 80 assigns an additional division 56 to that thread 48 to write respective metadata 58 to. Thus, if thread 48-2 finishes first, upper-deck manager 80 may then assign it to write upper-deck filesystem metadata 58 (e.g., block metadata) to division 56-33 (not depicted) (which occupies bytes 354,334,801,920 through 365,072,220,159 of the upper-deck filesystem 54).

Advantageously, even though metadata 58 placed around byte 354,334,801,920 (at the beginning of the $33^{rd}$ division 56-33) may be written prior to metadata 58 placed around byte 9,663,676,416 (towards the end of the first division 56-1), because the entire container file 64 was already pre-provisioned in step 130, the underlying slice 68 that includes byte 354,334,801,920 of the upper-deck filesystem 54 will be positioned sequentially well after the underlying slice 68 that includes byte 9,663,676,416 of the upper-deck filesystem 54. In addition, although it may take several seconds for each thread 48 to complete (and thus metadata 58 will begin to be written to the last division 56-50 several seconds after metadata is first written to the earlier divisions 56), all of the slices 68 within the container file 64 will be proximate to each other within the storage pool 70. Normally a delay of several seconds may be enough to allow other upper-deck filesystems and other volumes to interpose and claim intervening slices 72, but due to the pre-provisioning of step 130, the delay of several seconds will not allow that delay to affect the provisioning.

Thus, techniques have been described for pre-provisioning the lower-deck filesystem 60 with enough storage so that the container file 64 may be made up of proximately located slices 72 for predictably high performance.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method performed in a data storage processing system, the method comprising:
   receiving a command to create an upper-deck filesystem of a specified size, the upper-deck filesystem residing within a logical volume expressed from a container file of a lower-deck filesystem;
   provisioning a plurality of storage provisioning units (SPUs) from a storage pool of the data storage system to the container file in an order reflecting proximity of the SPUs within storage devices of the data storage system, the plurality of SPUs providing storage for the entire container file; and
   subsequent to provisioning the plurality of SPUs to the container file, executing a plurality of threads in parallel to write metadata of the upper-deck filesystem to the plurality of SPUs, representing the upper-deck filesystem;
   wherein provisioning the plurality of SPUs from the storage pool of the data storage system to the container file in the order reflecting proximity of the SPUs within the storage devices includes traversing the container file according to an internal order of its structure and issuing a sequence of write commands, while traversing the container file, according to the internal order of the structure to cause the storage pool to provision SPUs to the structure of the container file according to the internal order of the container file.

2. The method of claim 1, wherein provisioning the plurality of SPUs from the storage pool of the data storage system to the container file in the order reflecting proximity of the SPUs within the storage devices further includes placing the plurality of SPUs into a sparse volume underlying the lower-deck filesystem in order.

3. The method of claim 2, wherein placing the plurality of SPUs into a sparse volume underlying the lower-deck filesystem in order includes issuing a sequence of storage provisioning requests to the storage pool for consecutively-ordered SPUs of the container file.

4. The method of claim 1, wherein executing the plurality of threads in parallel to write metadata of the upper-deck filesystem to the plurality of SPUs further includes:
   dividing the upper-deck filesystem into a number of divisions, the number of divisions being larger than the number of threads;
   initially assigning each thread of the plurality of threads to write respective metadata to a different division; and
   upon each thread completing writing the respective metadata to its respective division, assigning an additional division to that thread to write respective metadata to.

5. The method of claim 1, wherein executing the plurality of threads in parallel to write metadata of the upper-deck filesystem to the plurality of SPUs includes executing the plurality of threads to allocate an inode table for the upper-deck filesystem.

6. The method of claim 1, wherein executing the plurality of threads in parallel to write metadata of the upper-deck filesystem to the plurality of SPUs further includes executing the plurality of threads to divide the upper-deck filesystem into upper-deck SPUs and to insert upper-deck SPU metadata into each upper-deck SPU to link the upper-deck SPUs together.

7. The method of claim 1,
   wherein the data storage system includes a plurality of storage devices arranged into a set of RAID groups, each RAID group spanning multiple storage devices, each RAID group providing multiple SPUs striped across the multiple storage devices of that RAID group to the storage pool; and wherein provisioning the plurality of SPUs from the storage pool of the data storage system in the order reflecting proximity of the SPUs within the storage devices includes provisioning a first SPU from a RAID group of the set of RAID groups, followed by a second SPU proximate to the first SPU within a layout of the RAID group, followed by additional SPUs in sequence, each additional SPU being proximate to a previous SPU within the layout of the RAID group.

8. The method of claim 7, wherein each SPU has a size of at least 256 megabytes.

9. The method of claim 1, wherein the method further comprises, in response to receiving the command to create the upper-deck filesystem of the specified size, creating the lower-deck filesystem in a sparsely-provisioned manner.

10. A computer program product comprising a non-transitory computer-readable storage medium storing a set of instructions, which, when executed by a data storage system, causes the data storage system to perform a method comprising:

receiving a command to create an upper-deck filesystem of a specified size, the upper-deck filesystem residing within a logical volume expressed from a container file of a lower-deck filesystem;

provisioning a plurality of storage provisioning units (SPUs) from a storage pool of the data storage system to the container file in an order reflecting proximity of the SPUs within storage devices of the data storage system, the plurality of SPUs providing storage for the entire container file; and subsequent to provisioning the plurality of SPUs to the container file, executing a plurality of threads in parallel to write metadata of the upper-deck filesystem to the plurality of SPUs, representing the upper-deck filesystem, wherein executing the plurality of threads in parallel to write metadata of the upper-deck filesystem to the plurality of SPUs includes:

dividing the upper-deck filesystem into a number of divisions, the number of divisions being larger than the number of threads;

initially assigning each thread of the plurality of threads to write respective metadata to a different division; and upon each thread completing writing the respective metadata to the its respective division, assigning an additional division to that thread to write respective metadata to.

11. The computer program product of claim 10, wherein provisioning the plurality of SPUs from the storage pool of the data storage system to the container file in the order reflecting proximity of the SPUs within the storage devices includes placing the plurality of SPUs into a sparse volume underlying the lower-deck filesystem in order.

12. The computer program product of claim 11, wherein placing the plurality of SPUs into a sparse volume underlying the lower-deck filesystem in order includes issuing a sequence of storage provisioning requests to the storage pool for consecutively-ordered SPUs of the container file.

13. The computer program product of claim 10, wherein provisioning the plurality of SPUs from the storage pool of the data storage system to the container file in the order reflecting proximity of the SPUs within the storage devices includes traversing the container file according to an internal order of its structure, and issuing a sequence of write commands, while traversing the container file, according to the internal order of the structure to cause the storage pool to provision SPUs to the structure of the container file according to the internal order of the container file.

14. An apparatus comprising:

a set of storage devices configured to provide a storage pool having a plurality of storage provisioning units (SPUs); and processing circuitry coupled to the set of storage devices, the processing circuitry being configured to:

receive a command to create an upper-deck filesystem of a specified size, the upper-deck filesystem residing within a logical volume expressed from a container file of a lower-deck filesystem;

provision a plurality of SPUs from a storage pool of the data storage system to the container file in an order reflecting proximity of the SPUs within the set of storage devices, the plurality of SPUs providing storage for the entire container file; and subsequent to provisioning the plurality of SPUs to the container file, execute a plurality of threads in parallel to write metadata of the upper-deck filesystem to the plurality of SPUs, representing the upper-deck filesystem;

wherein the set of storage devices is arranged into a set of RAID groups, each RAID group spanning multiple storage devices of the set of storage devices, each RAID group providing multiple SPUs striped across the multiple storage devices of that RAID group to the storage pool; and wherein provisioning the plurality of SPUs from the storage pool of the data storage system in the order reflecting proximity of the SPUs within the storage devices includes provisioning a first SPU from a RAID group of the set of RAID groups, followed by a second SPU proximate to the first SPU within a layout of the RAID group, followed by additional SPUs in sequence, each additional SPU being proximate to a previous SPU within the layout of the RAID group.

15. The apparatus of claim 14, wherein each SPU has a size of at least 256 megabytes.

* * * * *